United States Patent [19]

Monteleone et al.

[11] 4,432,125

[45] Feb. 21, 1984

[54] HINGE PIN REMOVAL TOOL

[76] Inventors: Nick Monteleone, 1142 Centoni Dr., Lake Zurich, Ill. 60047; Jerry Monteleone, 4840 N. Greenwood, Norridge, Ill. 60615; Lorenzo Monteleone, 808 Roppolo Dr., Elk Grove Village, Ill. 60007

[21] Appl. No.: 498,393

[22] Filed: May 26, 1983

Related U.S. Application Data

[63] Continuation of Ser. No. 282,411, Jul. 13, 1981.

[51] Int. Cl.[3] ........................ B22D 19/10; B23P 19/04

[52] U.S. Cl. .................................... 29/402.08; 29/255; 29/275; 29/426.5; 29/434

[58] Field of Search .............. 29/254, 255, 275, 426.5, 29/402.08, 434; 81/436; 145/46; 296/146

[56] References Cited

U.S. PATENT DOCUMENTS

| | | | |
|---|---|---|---|
| 1,487,592 | 3/1924 | Novotny | 29/255 |
| 1,863,956 | 6/1932 | Wilson | 29/275 |
| 2,682,103 | 6/1954 | Hamilton | 29/275 |
| 3,099,876 | 8/1963 | Lawless | 29/275 |
| 3,209,445 | 10/1965 | Moskovitz | 29/275 |
| 4,229,870 | 10/1980 | Tate | 29/254 |

*Primary Examiner*—Frederick R. Schmidt
*Assistant Examiner*—Steven P. Schad
*Attorney, Agent, or Firm*—Edmond T. Patnaude

[57] ABSTRACT

A spring pin removal tool has an attachment at one end for receipt in the chuck of a pneumatic impact tool, a short pilot projection at the other end for receipt in a compressed spring pin, a cylindrical portion having an external diameter of the compressed pin and a length less than the length of the pin.

1 Claim, 3 Drawing Figures

HINGE PIN REMOVAL TOOL

This is a continuation of application Ser. No. 282,411, filed July 13, 1981.

The present invention relates to a new and improved tool for removing a longitudinally split, spring type hinge pin from a hinge used to attach a door to the body of an automotive vehicle.

BACKGROUND OF THE INVENTION

One type of hinge which is used to attach the doors to the bodies of automobiles includes a longitudinally split hinge pin formed of spring metal. When the doors are thus mounted to the body of the associated vehicle, these pins are driven into the aligned openings in associated hinge members to pivotally connect them together. In its relieved state the external diameter of the hinge pin is greater than the diameters of the openings in the hinge members, and in assembling the hinge, the hinge pin is compressed and driven under extreme force in the aligned holes in the hinge members. As a consequence, in order to remove a door from the body of the vehicle during repair thereof, a substantial force must be applied in an axial direction to the pin to drive it through the openings in the hinge members. The hinges in most automobile designs are located behind the door frame on the sides of the door making it difficult to reach the hinge pins with conventional hinge removal tools such as punches and the like.

Another problem associated with the use of these types of hinges on automotive vehicles is the fact that the normal body shop does not have the equipment and facilities needed to reinsert such a hinge pin into the hinge after the door has been removed, repaired and must then be reassembled to the body. As a consequence, the cost of repairing the bodies of automotive vehicles using these types of hinges has been inordinately high compared to the cost of repairing vehicles using the more customary type of hinge.

SUMMARY OF THE INVENTION

Briefly, there is provided in accordance with the present invention a unitary, rigid, metal tool having an attachment means at one end adapted to be received in the chuck of a pneumatically operated impact device as commonly used in automotive repair facilities. At the other end of the tool is a short pilot projection which slidably fits into the bore of the spring pin when it is compressed within a hinge. Adjacent to the pilot projection is a rectlinear, cylindrical section having an external diameter which provides a slip fit with the openings in the hinge members to provide a shoulder adjacent the pilot projection which is engageable with the end of the spring pin and which is used to drive the pin through the openings. The cylindrical portion of the tool has a predetermined length which is less than the combined lengths of the openings through the tool, and an external annular shoulder is provided on the tool adjacent to this cylindrical portion for engaging the hinge to limit the extent to which the spring pin can be pushed through the openings so that the tool cannot be used to completely disassemble the spring pin from both of the hinge members. As a consequence, after the door has been repaired and the hinge member attached thereto is assembled to the hinge member attached to the body of the vehicle, the tool can again be used to drive the already compressed spring pin back through the openings to reassemble the door to the body. The portion of the tool located between this latter shoulder and the attachment means is bent at an angle of between twenty and forty degrees, but preferably about thirty degrees to enable the tool to be used to remove a hinge pin while the tool is mounted to a conventional pneumatic impacting device.

GENERAL DESCRIPTION OF THE DRAWINGS

The present invention will be better understood by a reading of the following detailed description taken in connection with the accompanying drawings wherein.

DETAILED DESCRIPTION OF THE INVENTION

Figure 1:
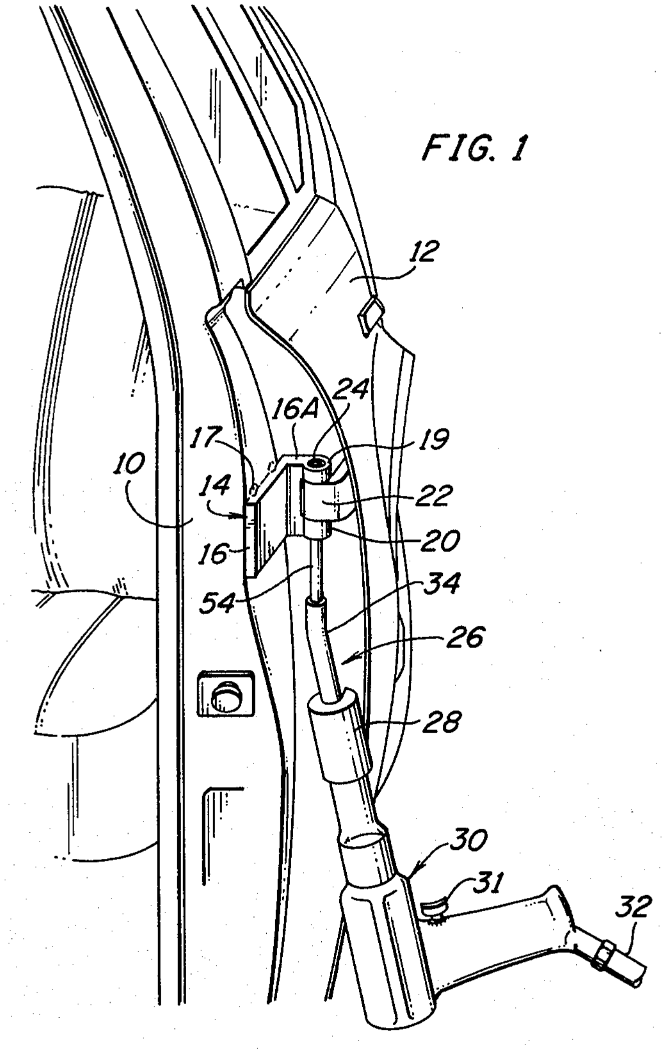
FIG. 1 is a perspective view of a portion of an automotive vehicle showing the tool of the present invention being used to disassemble the door of the vehicle from the body thereof.

Referring to FIG. 1, there is shown a portion of an automotive vehicle having a body 10 and a rear door 12 which is pivotally mounted to the body 10 by a hinge assembly 14. It will be understood that a similar hinge assembly (not visible in the drawings) is also provided for mounting the door 12 to the body 10. The hinge assembly 14 comprises a first hinge member 16 which is welded to the body 10 at 17 and has a laterally extending portion 16A having upper and lower cylindrical hinge ears 19 and 20 having axially aligned bores therethrough. These bores extend in a vertical direction and are aligned with a corresponding cylindrical bore in a cylindrical portion 22 of a hinge member 23 which is attached to the jamb portion of the door 12 by welding. The hinge members 16 and 23 are pivotally connected together by a longitudinally split, resilient hinge pin 24. The opening through the hinge part 23 is slightly larger in diameter than the aligned openings in the ears 19 and 20 whereby the pin 24 functions as a pintle around which the hinge part 22 connected to the door 12 pivots as the door swings between open and closed positions.

In FIG. 1 there is illustrated a tool 26 embodying the present invention in use to push the hinge pin 24 upwardly a sufficient amount so that its lower end clears the hinge part 23 but is not completely disassembled from the upper cylindrical hinge ear 19 of the hinge member 16. As shown, the tool 26 is mounted in the chuck 28 of a conventional pneumatic impactor 30 which is supplied with air under pressure through a suitable air hose 32. The impactor 30 includes a trigger 34 which when squeezed towards the handle causes the mechanism within the impactor to impact the distal end of the tool 26 to impart longitudinal shock waves thereto.

Figure 2:
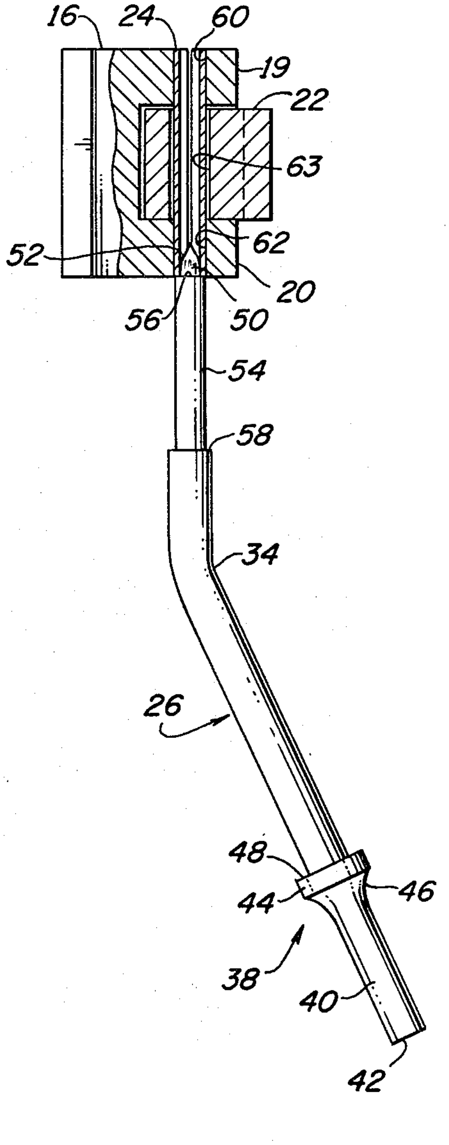
FIG. 2 is an elevational view of the tool of the present invention in use with a hinge shown in cross-section.
Figure 3:
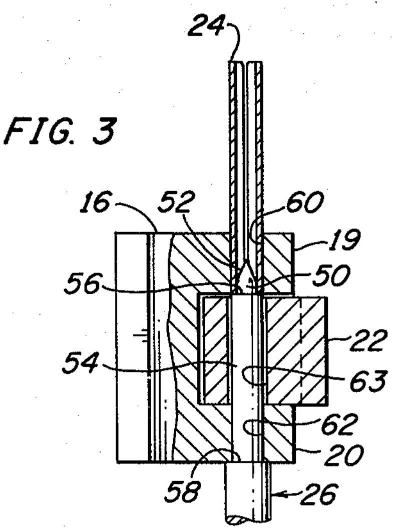
FIG. 3 is a fragmentary view similar to that of FIG. 2 showing the tool of the present invention fully inserted into a hinge assembly.

The manner in which the tool functions to drive the pin through the hinge parts to disassemble the hinge member 23 from the hinge member 16 will be better understood by reference to FIGS. 2 and 3 and the description thereof. It should be noted from inspection of FIG. 1, however, that the shank of the tool 26 is provided with a bend at 34 which permits the upper cylindrical end of the tool to be aligned with the openings in the hinge members when the tool is positioned against the end of the spring pin. This angle is preferably about thirty degrees (one hundred fifty degrees included angle) which will transmit the axial shock waves from the gun 30 to the upper end of the tool where it engages the hinge pin while permitting use of the tool with all known present-day automobiles using this type of hinge.

Referring to FIG. 2, the tool 26 may be seen to be a unitary metallic member having an elongated attachment means 38 at one end for insertion into the chuck of a pneumatic impactor. The adapter means 38 includes a cylindrical portion 40 having a flat distal end 42 and an annular flange 44 which connects to portion 40 by a smooth, curved portion 46. The flange 44 has a flat facial shoulder 38 facing toward the shank portion of the tool. At the other end of the tool there is provided a pilot projection 50 having a pointed distal end 52 and a short cylindrical body portion. Immediately adjacent to the pilot projection 50 is a rectilinear, cylindrical portion 54 having an external diameter greater than that of the projection 50 and providing an annular shoulder 56 facing toward the projection 50. The portion 54 has a diameter slightly less than that of the holes through the hinge parts 19 and 20. As explained hereinafter, the portion 54 is of a predetermined length and terminates at an annular external shoulder 58 on the main body or shank portion of the tool. The external diameter of the shoulder 58 is substantially greater than the external diameter of the portion 54.

As shown in FIG. 2, the tool is positioned with the pilot projection 50 extending into the hinge pin 24 at the beginning of a pin removal operation. It may be seen that the external diameter of the rectilinear portion 54 provides a slip fit with the openings 60 and 62 respectively provided in the hinge portions 19 and 20. The external diameter of the shoulder 58 is, however, substantially greater than the diameter of these openings. The rectilinear portion 54 has a length which is less than the combined lengths of the openings through the hinge member 16 and 23 so that when the tool 26 is impacted and longitudinal shock waves are imparted to the hinge pin to drive it upwardly through the openings 60 and 62, the hinge pin will not be completely driven out of the hinge part 19, but due to the friction between the pin and the wall of the hole in the part 19 will remain partially therein in a compressed condition with the lower end of the hinge pin above and clear of the hinge part 22.

FIG. 3 illustrates the condition of the tool when the shoulder 58 engages the lower surface of the hinge part 20. It may be seen that when the tool is subsequently removed, the hinge members can be disassembled from one another to remove the door from the vehicle. Once the door has been removed, the pin should be driven back down through the part 19 so that it extends from the opposite end while leaving the space between the parts 19 and 20 open. After the door has been repaired and is to be reassembled to the vehicle body with the hole 63 aligned with the holes through the holes 60 and 62, the pilot injection 50 can be inserted into the lower end of the hinge pin 24 so that when the impactor tool is actuated the tool will drive the pin back up into position to hingedly connect the two hinge parts together.

While the present invention has been described in connection with a particular embodiment thereof, it will be understood by those skilled in the art that many changes and and modifications may be made without departing from the true spirit and scope of the present invention. Therefore, it is intended by the appended claims to cover all such changes and modifications.

What is claimed:

1. A method of disassembling and subsequently assembling doors to automotive vehicles, which doors are secured to said vehicles by means of hinges having first and second mutually parallel ears fixedly secured to the body of the vehicle and a third ear fixedly attached to the door and adapted to be disposed between said first and second ears, a longitudinally split, tubular hinge pin being compressed near its respective ends in mutually aligned holes in said ears and loosely extending through a hole in said third ear, said last mentioned hole being aligned with said holes in said first and second ears when said door is assembled to said vehicle, comprising the steps of providing a unitary rigid metal members having elongated, enlarged attachment means at one end for reception in the chuck of a fluid operated impact device, said member having at its other end a short pilot projection having an external diameter which slidably fits into said spring pin when said spring pin is compressed in said openings, said member having adjacent to said pilot projection a rectilinear, cylindrical portion having an external diameter which slidably fits into said openings and is greater than the internal diameter of said spring pin when said spring pin is compressed in said openings thereby to provide an annular shoulder adjacent said pilot projection for engaging an end of said spring pin, said member having a bend between said attachment means and said cylindrical portion such that the included angle between the principal longitudinal axes of said cylindrical portion and said attachment is no more than about 150°, and a stop shoulder on said rectilinear, cylindrical portion facing toward said pilot projection to limit the distance said cylindrical portion is insertable into said first or second ears, said stop shoulder being spaced from said annular shoulder by a distance less than the combined lengths of said holes, attaching said attachment means to a fluid operated impact device, inserting said pilot projection into the one end of said spring pin adjacent said first ear, energizing said impact device while pressing said annular shoulder against said one end of said spring pin to push said spring pin completely through said first and third ears to press said stop shoulder against said first ear, removing said rigid metal member from between said first and second ears and then removing said door from said vehicle without removing said spring pin from said second ear, subsequently assembling said door to said vehicle with said third ear positioned between said first and second ears with said holes in said ears in mutual alignment, and pushing said spring pin through said hole in said third ear into said hole in said first ear.

* * * * *